United States Patent [19]

Hanson, Jr. et al.

[11] 4,193,373
[45] Mar. 18, 1980

[54] SPRAY APPARATUS FOR APPLYING INGREDIENT COATINGS TO FOOD PRODUCTS

[75] Inventors: Harold W. Hanson, Jr., Newport Beach; Beuford C. Doering, Costa Mesa, both of Calif.

[73] Assignee: Par-Way Co., Los Angeles, Calif.

[21] Appl. No.: 870,937

[22] Filed: Jan. 20, 1978

[51] Int. Cl.² .......................................... B05C 5/00
[52] U.S. Cl. ........................................ 118/17; 118/24; 118/316
[58] Field of Search .............. 118/17, 16, 24, 25, 118/302, 315, 316, 326; 239/548, 566, 296

[56] References Cited

U.S. PATENT DOCUMENTS

| | | | |
|---|---|---|---|
| 1,725,608 | 8/1929 | Zebulske | 426/306 |
| 2,041,765 | 5/1936 | Howell | 118/316 X |
| 2,734,479 | 2/1956 | Norris | 118/326 |
| 3,172,777 | 3/1965 | Pano et al. | 118/316 X |
| 3,424,128 | 1/1969 | Beaman | 118/314 |
| 3,596,633 | 8/1971 | Porter | 118/17 X |
| 3,878,992 | 4/1975 | MacManus | 118/24 X |

*Primary Examiner*—John P. McIntosh

[57] ABSTRACT

A readily sanitizable spraying apparatus particularly suited for applying an ingredient coating to food products in which the products to be sprayed are carried past spray heads by a conveyor. The heads are formed by interlocking members that are freely separable once removed from a cradle in which they are nested thus exposing delivery chambers within the heads for cleaning. The conveyor may include an endless belt that circulates on a conveyor frame which is pivotally mounted on a base so that it can be removed to expose interior portions of the apparatus, also for cleaning purposes. Since the belt has openings through which the ingredient can be sprayed onto the bottom surfaces of the food product, spray heads can be located below the belt as well as above.

24 Claims, 11 Drawing Figures fig.8 fig.9

SPRAY APPARATUS FOR APPLYING INGREDIENT COATINGS TO FOOD PRODUCTS

BACKGROUND OF THE INVENTION

The present invention relates to spraying apparatus generally, and, more particularly, to an apparatus suitable for spraying ingredients onto food products.

It is often desired, in a food processing or baking operation, to apply a relatively thin coating of an edible ingredient to a food product. Some ingredients, such as chocolate, are applied by a continuous falling curtain of ingredient through which the product passes as it moves along a horizontal conveyor path. These curtain operations require a very high rate of ingredient flow past the product with a large portion of the ingredient being recycled. An uneven coating results in which downwardly facing portions of an irregular product may remain uncovered. The bottom of the product cannot be coated at all. For the most part, however, the coating is thicker than desired, often requiring subsequent processing to remove excess ingredient. Another disadvantage of an ingredient curtain is that it requires that the product move slowly with a low rate of through put.

Another conventional ingredient coating technique, calls for passing the food product through an ingredient bath. This is also a slow process that often results in a coating thicker than desired. Baths are often used, for example, to apply batter to meat cutlets.

While various types of spraying apparatus have been used in the food processing industry, they have not, to the inventor's knowledge, been used to apply ingredient coatings. One spraying apparatus described in U.S. Pat. No. 3,424,128 is commonly used to spray greasing liquid or oil into the cavities of pans.

An important problem encountered in attempts to spray food ingredients derives from the high sanitation standards that must be met. These standards require that the interior of an apparatus used to apply ingredients be readily and conveniently accessible for frequent, thorough cleaning. A typical spraying apparatus, however, has long enclosed conduits, nozzles and other interior spaces that are accessible only when the apparatus has been tediously disassembled and then only to a limited extent, thus making cleaning a difficult and time consuming chore.

The problems associated with cleaning such conventional spraying apparatus would be compounded if ingredients were to be sprayed because of the relatively viscous nature of most ingredients when compared to commonly sprayed materials such as the oils used to coat baking pans. Viscous materials, are decidedly more difficult to remove from interior spaces where they may tend to collect and remain separated from the flow of fresh material through adjacent areas. In short, the problems associated with spraying ingredients onto food products are such that ingredients have not been sprayed commercially despite the known shortcomings of other ingredient application techniques.

SUMMARY OF THE INVENTION

The present invention resides in a spraying apparatus particularly suitable for applying ingredient coatings to food products. It provides ready access to the interior of its spray heads and other normally inaccessible areas so that the machine can be readily sanitized. In addition, this apparatus is usable with relatively viscous materials that could not be readily sprayed, under sanitary conditions, using previously known devices. As compared to conventional ingredient application equipment, it can have a high rate of product through put and can produce a thin, uniform coating.

The apparatus of the invention includes a conveyor for transporting the food product to be coated along a predetermined path and a plurality of spray heads arranged along the path. Each head is made up of a plurality of interlocking members that define an elongated ingredient delivery chamber and a coextensive air delivery chamber. A plurality of spray nozzles carried by the head are directed at the path. Each nozzle has an outer orifice communicating with the air delivery chamber and an inner orifice communicating with the ingredient delivery chamber. The interlocking members of the spray heads are freely separable, once removed from the apparatus, to expose the interior of the delivery chambers for cleaning.

The spray heads can be supported and positioned by a cradle having recesses in which the heads are nested. A fastener releasably secures the heads in their nested positions and, at the same time, holds the interlocking members together in an assembled condition.

It is advantageous, according to a more detailed aspect of the invention, to form each spray head from three mutually interlocking members. A first member defines the ingredient delivery chamber and an opposing second member defines the air delivery chamber. A third interlocking member is a divider plate disposed between the first and second members, separating the two channels. The nozzles can be formed by tubular, inner-orifice-defining passages projecting from the divider plate into the air delivery chamber and surrounded by outer orifices defined by the second member.

The fasteners that allow fast and convenient removal and disassembly of the spray heads are each formed by a bolt threadedly received by the cradle and a fastening plate, retained by the bolt, each plate engaging at least two heads. Preferably, the heads are generally rectangular and the cradle recesses are V-shaped.

In one embodiment of the invention, the conveyor includes an endless belt movably supported by a conveyor frame. The belt has openings therein so that ingredients can be applied to the product from beneath by spray heads mounted below the belt. According to another aspect of the invention, the conveyor frame is pivotally mounted on a base that supports the cradle and houses pumps for the ingredient and air. When the conveyor is moved into an open position, the bottom portion of the belt and other interior portions of the apparatus are readily accessible for cleaning.

Other features and advantages of the present invention will become apparent from the following detailed description, taken in conjunction with the accompanying drawings which illustrates, by way of example, the principles of the invention.

DESCRIPTION OF THE PREFERRED EMBODIMENT

The invention is embodied in an exemplary apparatus 10 suitable for spraying ingredients onto food products, shown in FIGS. 1-11 of the accompanying drawings. In general, it comprises a base 12, a conveyor 14 mounted on the base, and a plurality of spray heads 16 supported adjacent the conveyor by a cradle 18.

Figure 1:
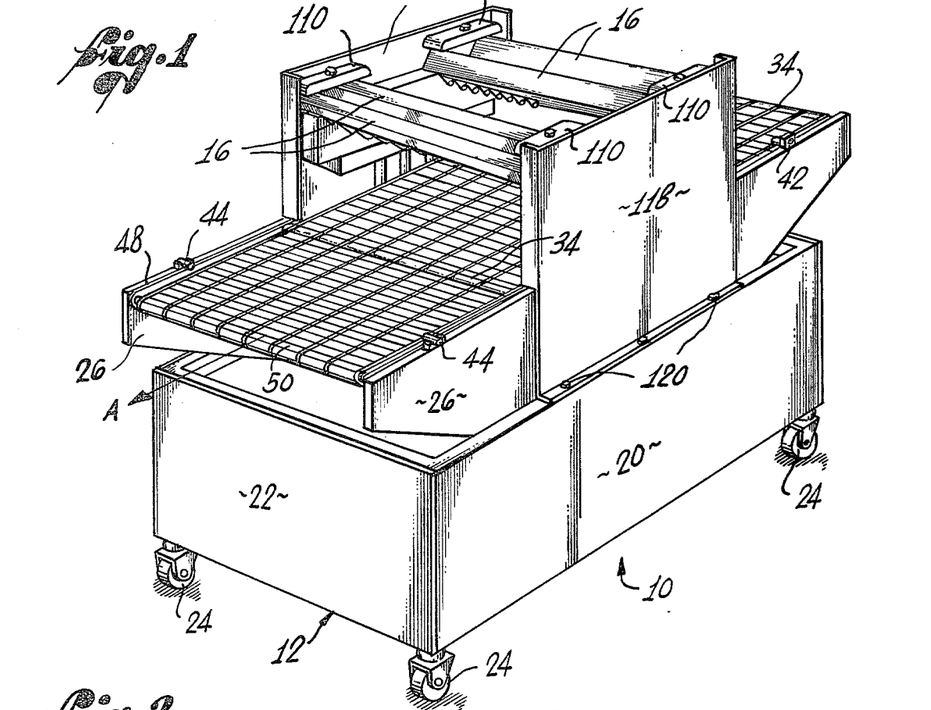
FIG. 1 is a three dimensional, pictorial representation of an ingredient spraying machine constructed in accordance with the present invention.

The base 12 is a box-like structure having vertical side walls 20 and end walls 22. It stands on four castors 24, one attached at each corner, as shown in FIGS. 1, 6 and 9, so that it can be moved about.

Figure 6:
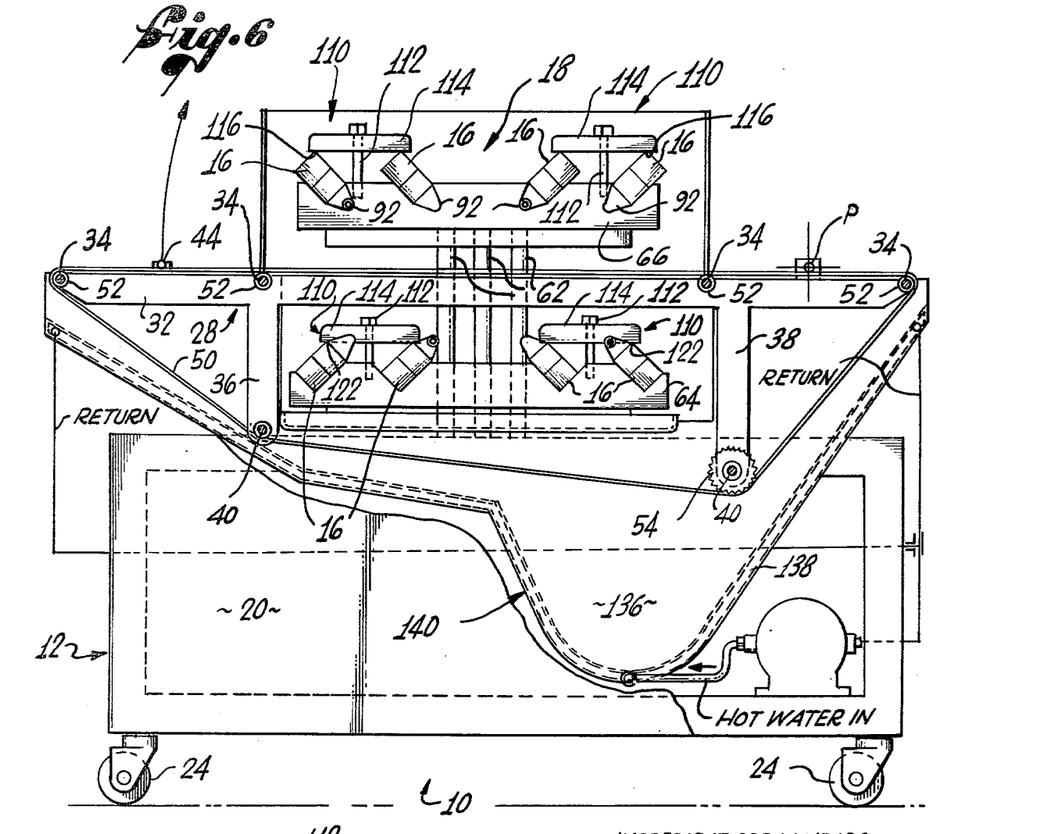
FIG. 6 is an enlarged, partially broken away, side elevation of the machine.
Figure 9:
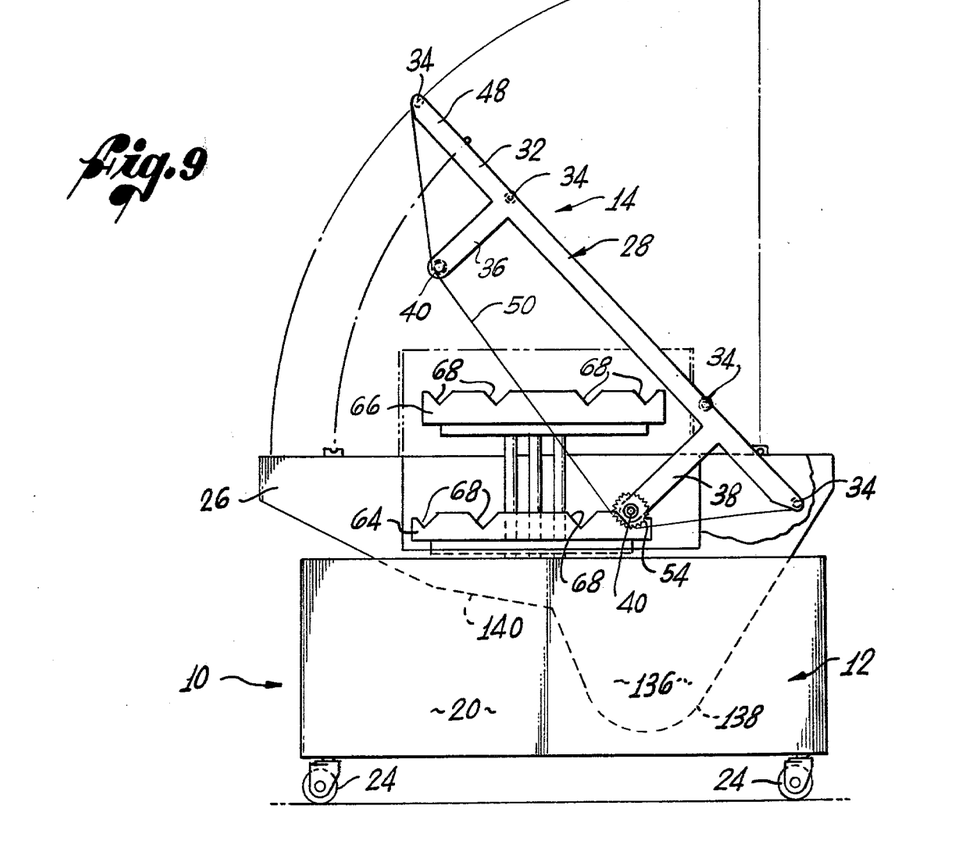
FIG. 9 is another partially broken away side elevation of the machine with the spray heads removed and the conveyor in an open position.

The conveyor 14 includes two vertical support plates 26 that extend upwardly from the side walls 20 of the base 12 and a conveyor frame 28 pivotally mounted on the inside surfaces 30 of the support plates, as best shown in FIGS. 6 and 9. The frame 28 has two elongated, parallel, normally horizontal main frame members 32, one on each side, and four perpendicular cross rods 34 that separate the main frame members. Two normally vertical downwardly projecting struts 36 and 38 extend from each main frame member 32, with two additional cross rods 40 connecting the lower ends of opposite struts. The conveyor frame 28 is pivotally attached to the support plates 26 by two pivot pins 42. Near the front end of each main frame member 32 is an outwardly projecting lug 44 that rests in a notch 46 on the top of the corresponding supporting plate 26 when the main frame members 32 are horizontal. The conveyor frame 28 can be moved to an open position, shown in FIG. 8, by lifting its front end 48, causing it to pivot on the pins 42.

Figure 7:
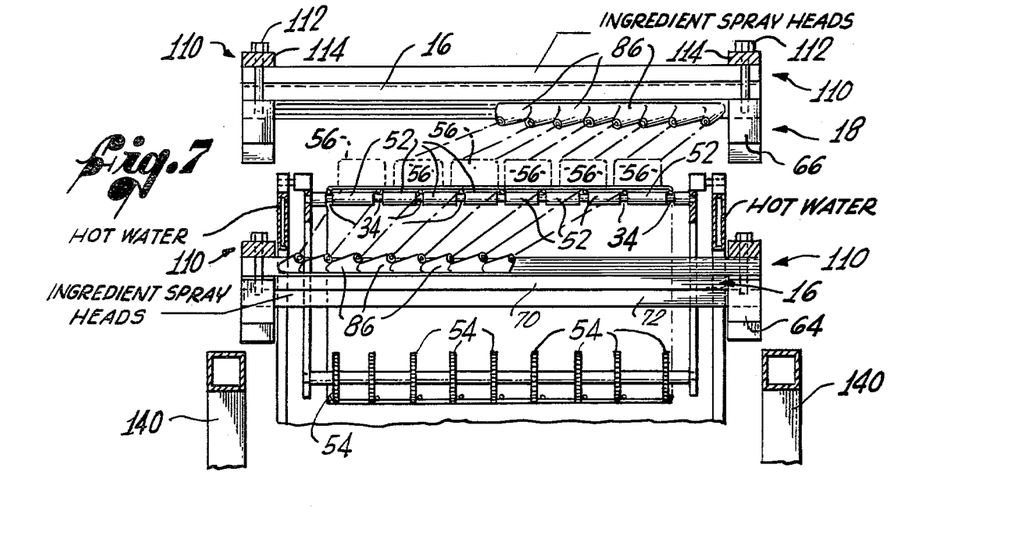
FIG. 7 is an enlarged partially broken away, fragmentary view of the machine showing some of the spray heads and part of the conveyor.
Figure 8:
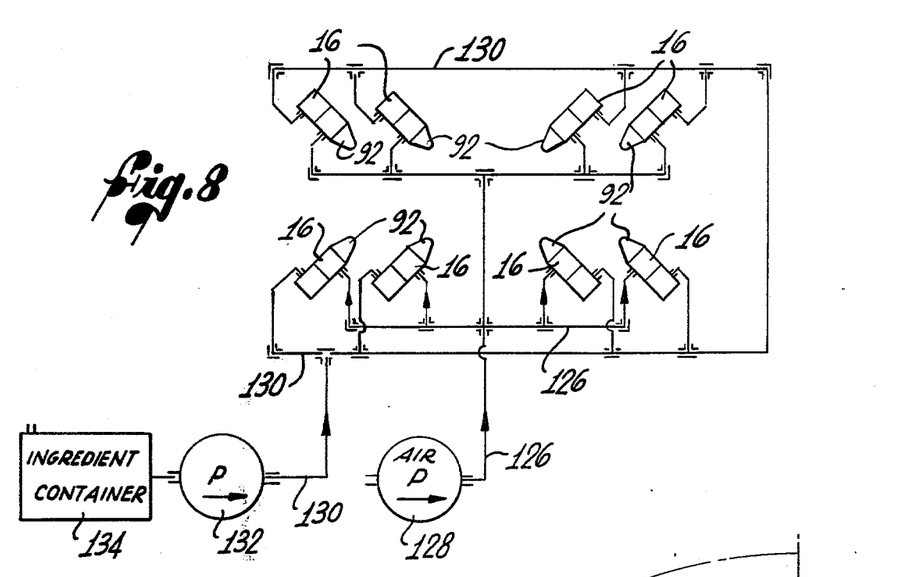
FIG. 8 is a schematic diagram of the nozzles and pumping system of the machine.

An endless mesh-type metal belt 50 encircles the frame 28, riding on a plurality of rotatable guides 52 journaled on the cross-rods 34 and 40 (see FIG. 7). The belt 50 is driven, to circulate on the frame 28, by a plurality of sprockets 54 mounted on one of the cross rods 40 and connected to an electric motor (not shown). With the conveyor frame 28 in its normal closed position, the circulating belt 50 carries food products 56 along a horizontal path A from an input end 58 of the machine 10 to an output end 60.

When the conveyor frame 28 is in its open position (FIG. 9) otherwise inaccessible interior portions of the machine 10 are easily reachable for cleaning. It is, therefore, easier to maintain the higher sanitation standards that are necessary when the material being sprayed is a food product ingredient.

The cradle 18 for the spray heads 16 consists of three vertical stanchions 62 extending upwardly from the base 12 on each side of the machine 10, the stanchions being located between the inside surfaces of the support plates 26 and the outside edges of the belt 50. Each set of three stanchions 62 supports two vertically separated horizontal cradle pieces 64 and 66. The lower cradle pieces 64 are located between the support plates 26 while the upper cradle pieces 66 are positioned above the top edges of the support plates. Each cradle piece 64, 66 defines four upwardly facing V-shaped recesses or notches 68 to receive the spray heads 16, as best shown in FIG. 9.

The spray heads 16 are generally elongated and box-like, as best shown in FIGS. 2, 3, 4 and 5. Each head 16 consists of three interlocking members, an ingredient delivery member 70, an air delivery member 72 and a divider plate 74.

Two complementary spray head configurations are used. The configuration of FIG. 2 will be described first. The ingredient delivery member 70 defines an elongated ingredient delivery chamber 76 open along one major side and approximately square in cross-section. The ingredient cavity 76 begins adjacent one end of the ingredient delivering member 70 and extends along slightly more than one-half its length. A smaller elongated longitudinal passageway 78 that opens into the ingredient chamber 76 extends along the remainder of the member 70, opening throughout its length in the same orientation as the chamber 76.

Figure 2:
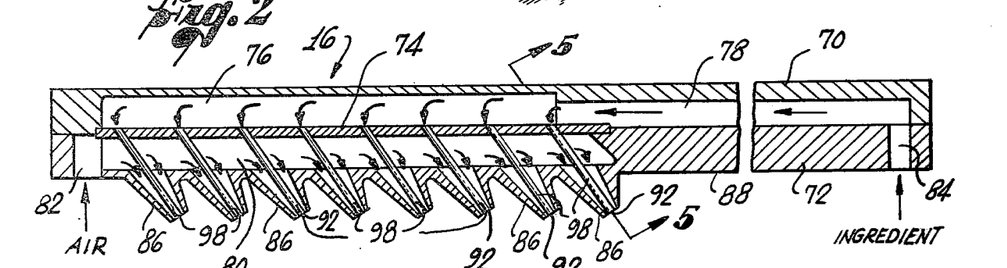
FIGS. 2 and 3 are enlarged cross-sectional side views of two complementary spray heads of the machine.

The air delivery member 72 is of the same length and width as the ingredient delivery member 70 and defines an air delivery chamber 80 with an open major side similar in configuration to the ingredient chamber 76, but it does not include a longitudinal passageway. It does, however, include short conduits 82 and 84 perpendicular to the major axis of the chamber 80. The first such conduit 82 communicates with the air chamber 80 while the other conduit 84, at the opposite end, extends completely through the air delivery member 78.

The delivery members 70 and 72 are assembled in opposed overlying relationship with the chambers 76 and 80 being coextensive and opposing each other, i.e., opening toward each other. The second short conduit 84 of the air delivery member 80 then communicates with and provides an inlet to the passageway 78 and the ingredient chamber 76. A plurality of short, hollow conical projections 86 extend from the surface 88 of the air delivery member 70 that is farthest from the ingredient delivery member 72 to form the outer orifices 90 of spray nozzles 92 as explained below. All nozzles 92 of a single head 16 have the same orientation.

The third member that forms the spray head 16 is a flat, elongated divider plate 74 received by a perimetrical recess 96 formed about the junction of the delivery members 70 and 72 and opening into the chambers 76 and 80. One-half of the recess 96 is defined by the ingredient delivery member 70 while the coextensive and opposing second half is defined by the air delivery member 72. The divider plate 74 thus separates the ingredient chamber 76 from the air chamber 80.

Figure 5:
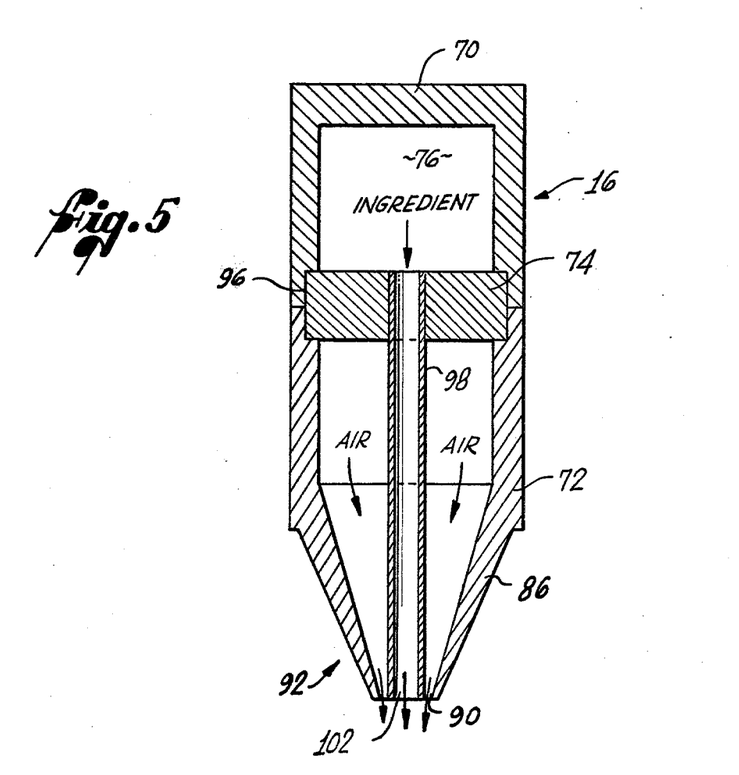
FIG. 5 is an enlarged cross-sectional view of the spray head of FIG. 2 taken along the line 5—5.

A plurality of parallel, hollow, tubular projections 98 extend at acute angles from the divider plate 74 into the outer orifices 90 of the air delivery member 72. Since the outside diameter of the tubular projections 98 is less than the diameter of the outer orifices 90, an annular space surrounding each tubular projection provides an outlet from the air chamber. An inner orifice 102 defined by each tubular projection 98 communicates with the ingredient chamber 76 to provide an ingredient outlet (FIG. 5). The nozzles 92 are thus formed so that moving air that exits from the air chamber 80 through the outer orifices 90 will pick up and spray ingredient supplied at the inner orifice 102.

Figure 3:
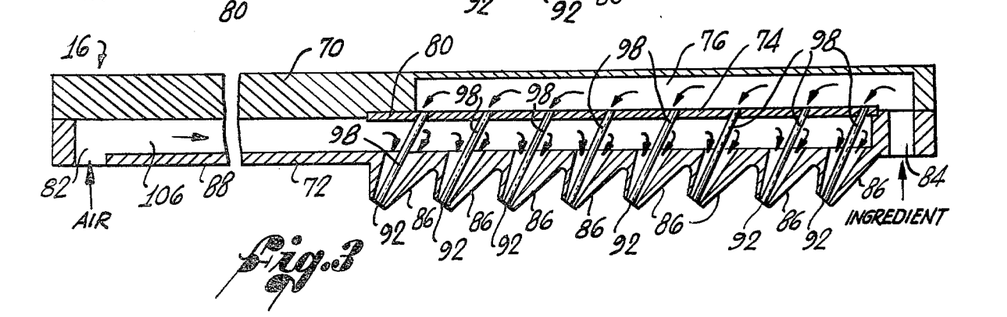
Figure 4:
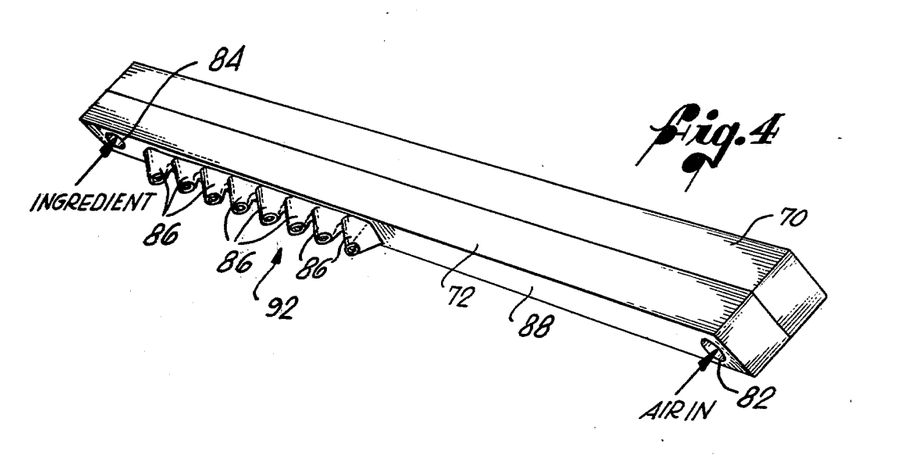
FIG. 4 is an enlarged, three-dimensional, pictorial representation of the spray heads of FIGS. 2 and 3.

The second spary head configuration, shown in FIG. 3, differs from the first (FIG. 2), described above, in that a passageway 106, is formed in the air delivery member 72 as a continuation of the air chamber 80, and the passageway 78 in the ingredient delivery member 70 is omitted. Simplification of the system of supplying air and ingredient is accomplished by selecting the spray head configuration that is capable of receiving ingredient and air on the side where each is conveniently available. The particular air and ingredient supply arrangement of the machine 10 is described in greater detail below.

It should be noted that while the components of each spray nozzle 92 are mutually interlocking by virtue of the recess 96 in which the divider plate 74 is received, these components are nevertheless freely separable. Once removed from the spraying machine 10, they are not held together by rivets, screws or any other fastening device. For this reason they are quickly and easily disassembled for cleaning by unskilled personnel and the sanitary standards required in an ingredient applying device are readily met.

To hold the spray heads 16 in an assembled condition and support them in the desired positions with respect to the conveyor path A, the heads are nested in the V-shaped notches 68 of the cradle pieces 64 and 66. The heads 16 are arranged in an upper group above the conveyor path A and a lower group beneath the conveyor path, there being four heads in each group. All the heads 16 are parallel to each other and perpendicular to the path A.

Figure 10:
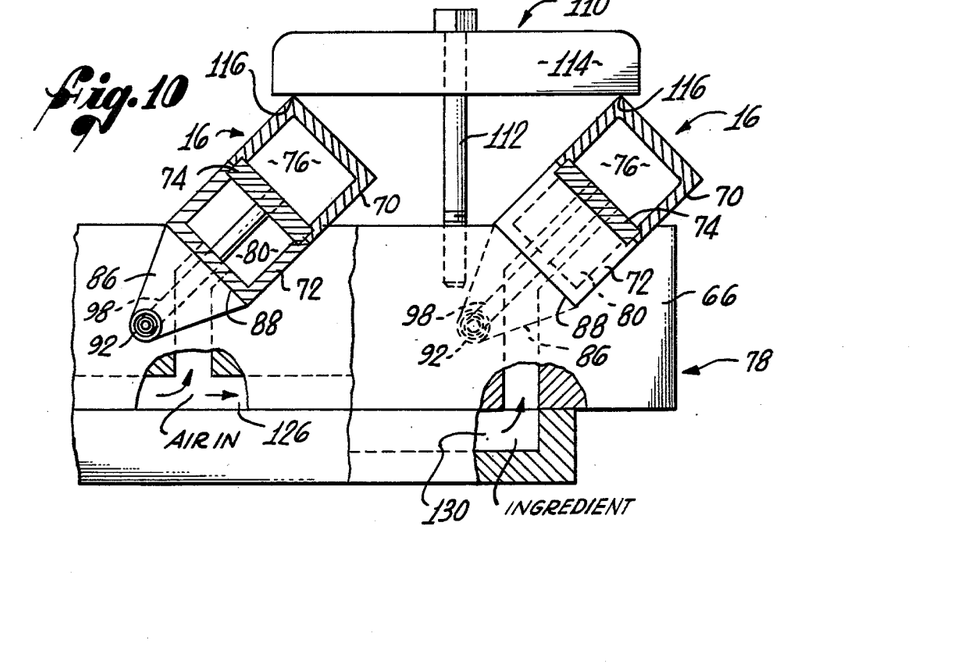
FIG. 10 is an enlarged, fragmentary, partially broken away view of a fragmentary portion of the machine showing portions of the spray heads and cradle.
Figure 11:
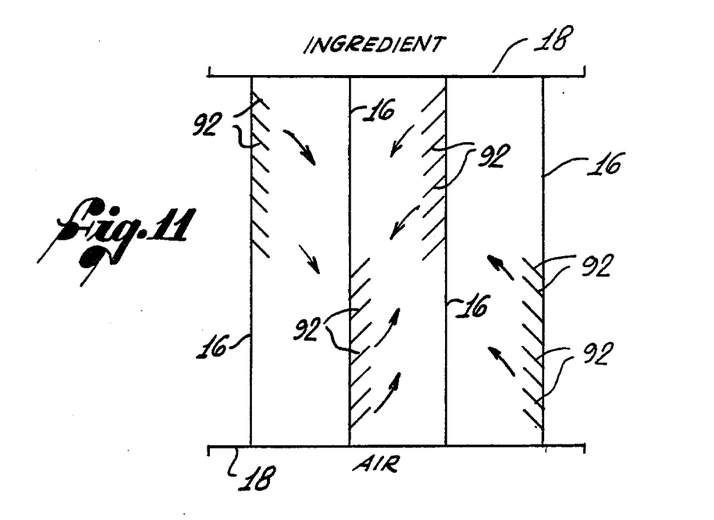
FIG. 11 is a schematic diagram showing the relative orientations of the spray heads and nozzles.

In the case of the upper heads 16 the air delivery member 72 is held at the bottom of the notch 68 with its nozzle-bearing surface 88 and one of the perpendicular side surfaces 108 resting against the surfaces of the notch 68, the notch surfaces being perpendicular to each other and forming 45 degree angles with the horizontal conveyor belt 50, as best shown in FIG. 10. The ingredient delivery member 70, being canted at the same angle as the air delivery member 72, has its lower side resting on a continuation of one of the notch surfaces.

The upper heads 16 are releasably secured to the cradle 18 by four quick-release fasteners 110. The upper heads 16 may be viewed as two pairs, one pair at each end of the machine 10, and each pair is jointly engaged by a fastener 110 at each end.

Each fastener 110 includes a vertical bolt 112 that projects downwardly into a threaded hole in the cradle 18, the bolt being positioned between the two adjacent heads 16 of a single pair. At its top end, the bolt 112 extends through a fastening plate 114 which is thus pressed downwardly and bears against the top edges 116 of the ingredient delivery members 70, as best shown in FIG. 10. So long as the fastener plates 114 remain in position, the adjacent heads 16 are not only held firmly in place but their interlocking components are retained in an assembled condition, the ingredient delivery members 70 being pressed against the opposing air delivery members 72. All that is required, however, to remove and completely disassemble the heads 16 is to remove the fastener bolts 112 and lift the heads out of the cradle 18.

The machine 10 also includes two vertical side plates 118 that extend upwardly from the side walls 20 outside the support plates 26 and the cradle 18 (FIG. 1). These side plates 118 are held in position by only a few screw-type fasteners 120 so they are easily removable to provide relatively unobstructed access to the heads 16.

The two upper heads 16 at the input end 58 of the machine 10 have their nozzles 92 pointed in the direction of belt movement while the heads at the output end 60 have their nozzles pointed in the opposite direction so that the product 56 will be coated at its leading and trailing surfaces as it moves along the conveyor path A.

Each head 16 has nozzles 92 along only a portion of its length, starting at one end but inclined toward that opposite end, as explained above. The arrangement of the heads 16, as shown diagrammatically in FIG. 11, is such that the pair of adjacent heads 16 at each end of the machine 10 have opposite sideways nozzle inclinations. The product 56 is thus sprayed from both sides as well as the front and back (FIG. 6).

It should be noted that the two heads 16 of each pair are of different, complementary constructions, as shown in FIGS. 2 and 3, respectively. They are arranged so that the ingredient enters all heads 16 on one side of the machine 10 and the air enters all heads from the opposite side of the machine, despite the fact that some heads have their nozzles 92 at one side while other heads have their nozzles at the opposite side.

The lower group of heads 16 is located beneath the belt 50 in an arrangement similar to that employed with respect to the upper group, the principal difference being that the ingredient delivery members 70 are positioned at the bottoms of the cradle notches 68 and the air delivery members 70 are positioned on top. Accordingly, the nozzles 92 of the lower heads 16 point generally upwardly, directing their spray through the openings in the mesh type belt 50. The lower fasteners 110 engage the top edge 122 of the air delivery members 72 of the lower heads 16. If it is not desired to spray the product 56 from beneath, the lower heads 16 can be omitted.

Air to be supplied to the air delivery member 72 is forced into a plurality of interconnected air conduits 126 by an air blower 128 mounted in the base 12. The machine has been operated successfully using a blower that produces pressures sufficient to raise a column of water 30 to 100 inches, although pressures outside this range may also be satisfactory.

The ingredient is carried to the ingredient delivery members 70 through interconnected ingredient conduits 130. A pump 132 disposed within the base 12 continuously supplies ingredient to the conduits 130 from a reservoir 134. (The blower 128, pump 132 and reservoir 134 are visible only in FIG. 7 since they are hidden by the sidewalls 20 of the base 12.) The thickness of the ingredient coating can be varied by changing the air pressure pumping rate, and conveyor speed.

Sprayed ingredient that does not adhere to the product 56 falls into a large ingredient collection cavity 136 within the base 12, the vertical walls of the cavity being the support plates 26, as best shown in FIGS. 7 and 9. In this embodiment, the walls 26 and floor 138 of the cavity 136 form a jacket 140 through which heated water continuously circulates. The water can be heated by an internal heater (not shown) or supplied from an external source.

The water jacket 140 of the machine 10 is important in the case of ingredients such as chocolate that lose their liquidity as their temperature drops. In the case of some other ingredients, this feature can be omitted.

Ingredient collected at the bottom of the cavity 136 is drained off into the reservoir 134 for recirculation. It should be noted, however, that a relatively small percentage of the ingredient is recirculated when compared to the recirculation required when the same ingredient is applied by a conventional "curtain" technique.

The present invention provides a readily cleaned and sanitized machine for spraying coatings onto food products. It can be used to spray relatively viscous ingredients including chocolate and meat batters as well as thinner ingredients of a viscosity more commonly encountered in sprayed products. Nevertheless, the machine is relatively simple, reliable and manufacturable at a relatively low cost.

While particular forms of the invention have been illustrated and described, it will also be apparent that various modifications can be made without departing from the spirit and scope of the invention.

I claim:

1. A spray apparatus comprising:
   conveyor means for transporting a product to be sprayed along a predetermined path;
   a plurality of spray heads arranged along said path each including a first interlocking member that defines an ingredient delivery chamber, a second interlocking member that defines an air delivery chamber substantially coextensive with said ingredient delivery chamber, a divider plate disposed between said first and second interlocking members and interlocked therewith that separates said chambers, and a plurality of spray nozzles directed at said path each having an outer orifice communicating with said air delivery chamber and an inner orifice communicating with said ingredient delivery chamber, said interlocking members being separable to expose the interior of said ingredient delivery chamber for cleaning;
   means for supplying said ingredient to said ingredient delivery chamber; and
   means for supplying air to said air delivery chamber.

2. The apparatus of claim 1, further comprising a cradle for supporting and positioning said spray heads, said cradle defining a plurality of recesses in which said spray heads are nested.

3. The apparatus of claim 2, further comprising fastening means for releasably securing said spray heads in their nested positions.

4. The apparatus of claim 3, wherein said fastening means includes a plurality of fastening plates each of which engages a plurality of said spray heads.

5. The apparatus of claim 3, wherein said interlocking members are held in an assembled position only by said fastening means and said cradle.

6. The apparatus of claim 1, wherein said spray heads form an upper group and a lower group, said groups being disposed on opposite sides of said path.

7. The apparatus of claim 6, wherein said conveyor means includes a belt on which said food product is supported, said belt having openings therein to permit ingredients from said lower spray heads to reach said food products from below.

8. The apparatus of claim 6, wherein said conveyor means further includes a conveyor frame on which said belt is movably supported, said apparatus further comprising a base and means for pivotally mounting said conveyor frame on said base, whereby said conveyor means can be moved for cleaning purposes.

9. The apparatus of claim 1, wherein said nozzles are arranged along said second member.

10. The apparatus of claim 9, wherein said outer orifices are defined by said second member and said inner orifices are defined by passages projecting from said divider plate.

11. The apparatus of claim 9, wherein all of said nozzles of each spray head have substantially the same orientation and nozzles of horizontally adjacent spray heads have different orientations.

12. The apparatus of claim 1 further comprising water jacket means for heating sprayed ingredient to be recycled, said water jacket means defining a cavity below said path.

13. An apparatus for spraying an ingredient coating onto a food product comprising:
    endless conveyor means for transporting said food product to be sprayed along a predetermined horizontal path;
    a plurality of spray heads arranged along said path, each of said heads comprising (i) a first elongated member defining an ingredient delivery chamber, (ii) a second elongated member opposing said first elongated member and defining an air delivery chamber coextensive with said ingredient delivery chamber, and (iii) a divider plate disposed between said first and second elongated members, separating said delivery chambers and having a plurality of inner orifice defining passages projecting therefrom into said air delivery chamber, said second elongated member defining a plurality of outer orifices each of which surrounds one of said inner orifices to form a spray nozzle, said first and second elongated members and said divider plate being of mutually interlocking configuration but being freely separable;
    a cradle for supporting and positioning said spray heads, said cradle defining a plurality of recesses in which said spray heads are nested;
    fastening means for releasably securing said spray heads to said cradle in their nested position and for retaining said spray heads in an assembled condition;
    means for supplying said ingredient to said ingredient delivery chamber; and
    blower means for supplying air to said air delivery chamber.

14. The apparatus of claim 13, wherein said fastening means comprises a plurality of bolts threadedly received by said cradle and a plurality of fastening plates, each of said plates being retained by one of said bolts and engaging at least two of said spray heads.

15. The apparatus of claim 13, wherein each of said spray heads has a generally rectangular, box-like shape and each of said recesses is V-shaped.

16. The apparatus of claim 13, wherein said spray heads form an upper group and a lower group, said groups being disposed on opposite sides of said path.

17. The apparatus of claim 13, wherein said conveyor means includes a belt on which said food product is supported, said belt having openings therein to permit ingredients from said lower spray heads to reach said food products from below.

18. The apparatus of claim 17, wherein said conveyor means further includes a conveyor frame on which said belt is movably supported, said apparatus further comprising a base and means for pivotally mounting said conveyor frame on the base, whereby said conveyor means can be moved for cleaning purposes.

19. The apparatus of claim 13, wherein all of said nozzles of each spray head have substantially the same orientation and the nozzles of horizontally adjacent spray heads have different orientations.

20. An apparatus for spraying an ingredient coating onto a food product comprising:
   a base;
   conveyor means for transporting said food product along a predetermined horizontal path, said conveyor means including a conveyor frame, an endless belt movably supported by said frame for circulatory movement thereon, said belt having openings therein to permit said food product to be sprayed from beneath, and means for pivotally mounting said conveyor frame on said base;
   a plurality of spray heads of generally rectangular outline arranged above and below said path, each of said heads comprising a first elongated member defining an ingredient delivery chamber, a second elongated member opposing said first elongated member and defining an air delivery chamber, a divider plate disposed between said first and second chambers and having a plurality of tubular inner orifice defining passages projecting therefrom into said air delivery chamber, said first and second members and said divider plate being of mutually interlocking configuration but being freely separable, said second elongated member defining a plurality of outer orifices each of which surrounds one of said tubular passages to form a spray nozzle directed toward said path, horizontally adjacent spray heads having different orientations;
   a cradle for supporting and positioning said spray heads, said cradle defining a plurality of V-shaped recesses in which said spray heads are nested;
   fastening means for releasably securing said spray heads to said cradle in their nested positions and for retaining said spray heads in an assembled condition, said fastening means comprising a plurality of bolts threadedly received by said cradle and a plurality of fastening plates, each plate being retained by one of said bolts and engaging at least two of said spray heads;
   means mounted on said base for supplying said ingredient to said ingredient delivery chamber; and
   blower means mounted on said base for supplying air to said air delivery chamber.

21. A spray apparatus comprising:
   conveyor means for transporting a product to be sprayed along a predetermined path;
   a plurality of spray heads arranged along said path each including a plurality of members that are elongated along longitudinal axes and are separably and interlockingly mutually engaged along said axes to define an elongated ingredient delivery chamber extending along said axes, a substantially coextensive air delivery chamber, and a plurality of spray nozzles directed at said path each having a first orifice communicating with said air delivery chamber and a second orifice communicating with said ingredient delivery chamber, said members being disassemblable along said axes to expose the interior of said chambers for cleaning;
   cradle means for supporting said members in their interlocking positions;
   fastening means for releasably securing said spray heads in said cradle means;
   means for supplying said ingredient to said ingredient delivery chamber; and
   means for supplying air to said air delivery chamber.

22. The apparatus of claim 21, wherein said members are held in said interlocking positions only by said fastening means and said cradle.

23. A spray apparatus comprising:
   conveyor means for transporting a product to be sprayed along a predetermined path;
   a plurality of spray heads arranged along said path each including a plurality of elongated interlocking members assembled to define an elongated ingredient delivery chamber, a substantially coextensive air delivery chamber, and a plurality of spray nozzles directed at said path each having an outer orifice communicating with said air delivery chamber and an inner orifice communicating with said ingredient delivery chamber, said interlocking members being disassemblable to expose the interior of said chambers for cleaning;
   a cradle defining a plurality of recesses in which said spray heads are nested;
   fastening means for releasably securing said spray heads in their nested positions and thereby holding said interlocking members in said assembled relationship;
   means for supplying said ingredient to said ingredient delivery chamber; and
   means for supplying air to said air delivery chamber.

24. The apparatus of claim 23, wherein said fastening means includes a plurality of fastening plates each of which engages a plurality of said spray heads.

* * * * *